United States Patent
Sen et al.

(10) Patent No.: US 11,941,111 B2
(45) Date of Patent: Mar. 26, 2024

(54) EXPLOITING FINE-GRAINED STRUCTURED WEIGHT SPARSITY IN SYSTOLIC ARRAYS

(71) Applicant: INTERNATIONAL BUSINESS MACHINES CORPORATION, Armonk, NY (US)

(72) Inventors: Sanchari Sen, Indianapolis, IN (US); Swagath Venkataramani, Yorktown Heights, NY (US); Vijayalakshmi Srinivasan, Yorktown Heights, NY (US); Kailash Gopalakrishnan, Yorktown Heights, NY (US); Sunil K. Shukla, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 17/444,187

(22) Filed: Jul. 31, 2021

(65) Prior Publication Data
US 2023/0030287 A1 Feb. 2, 2023

(51) Int. Cl.
*G06F 21/00* (2013.01)
*G06F 7/544* (2006.01)
(Continued)

(52) U.S. Cl.
CPC ............ *G06F 21/55* (2013.01); *G06F 7/5443* (2013.01); *G06N 3/04* (2013.01); *G06F 2221/034* (2013.01)

(58) Field of Classification Search
CPC .. G06F 21/55; G06F 7/5443; G06F 2221/034; G06N 3/04
See application file for complete search history.

(56) References Cited

U.S. PATENT DOCUMENTS 11,488,018 B1 * 11/2022 Woo .................. G06N 3/04
2019/0370645 A1 * 12/2019 Lee .................. G06N 3/063
(Continued)

FOREIGN PATENT DOCUMENTS

| CN | 110705703 A | 1/2020 |
| CN | 112424798 A | 2/2021 |

(Continued)

OTHER PUBLICATIONS

Sen et al., "SPARCE: Sparsity Aware General-Purpose Core Extensions to Accelerate Deep Neural Networks", IEEE Transactions on Computers, vol. 68, No. 6, Jun. 2019.*
(Continued)

*Primary Examiner* — Morshed Mehedi
(74) *Attorney, Agent, or Firm* — Gilbert Harmon, Jr.

(57) ABSTRACT

Indices of non-zero weights may be stored in an index register file included within each of a plurality of processor elements in a systolic array. Non-zero weights may be stored in a register file associated with the index register file. Input values (e.g., dense input values) corresponding to a single block in a data structure may be sent to the plurality of processor elements. Those of the input values corresponding to the indices of non-zero weights in the index register file may be selected for performing multiply-accumulate ("MAC") operation based on sending the plurality of input values to one or more of the plurality of processor elements. The indices of the plurality of non-zero weight are stored in an index data stick. The values of the plurality of non-zero weights are stored in a value data stick.

25 Claims, 8 Drawing Sheets

(51) Int. Cl.
  *G06F 21/55* (2013.01)
  *G06N 3/04* (2023.01)

(56) References Cited

U.S. PATENT DOCUMENTS

| | | | | |
|---|---|---|---|---|
| 2020/0341772 | A1* | 10/2020 | Chilappagari | G06F 9/30109 |
| 2020/0401895 | A1* | 12/2020 | Litvak | G06N 3/02 |
| 2021/0035258 | A1 | 2/2021 | Ray | |
| 2021/0049474 | A1* | 2/2021 | Son | G06N 3/044 |
| 2021/0089864 | A1* | 3/2021 | Dally | G06F 9/30018 |
| 2021/0157548 | A1* | 5/2021 | Elmer | G06F 15/8046 |
| 2021/0224640 | A1* | 7/2021 | Nakahara | G06N 3/045 |
| 2022/0188075 | A1* | 6/2022 | Raha | G06F 7/483 |
| 2022/0261623 | A1* | 8/2022 | Sung | G06F 7/50 |
| 2023/0012127 | A1* | 1/2023 | Mehendale | G06N 3/063 |

FOREIGN PATENT DOCUMENTS

| | | |
|---|---|---|
| EP | 3789928 A2 | 3/2021 |
| WO | 2023011990 A1 | 2/2023 |

OTHER PUBLICATIONS

Li, Fanrong et al., "FSA: A Fine-Grained Systolic Accelerator for Sparse CNNs", IEEE Transactions on Computer-aided Design of Integrated Circuits and Systems, vol. 39. No. 11, Nov. 2020 (pp. 12).

Liu, Zhi-Gang et al., "Sparse Systolic Tensor Array for Efficient CNN Hardware Acceleration." Arm ML Research Lab, Boston, MA, ArXiv abs/2009.02381 Oct. 12, 2020 (pp. 13).

Zhu, Maohua et al., "Sparse Tensor Core: Algorithm and Hardware Co-Design for Vector-wise Sparse Neural Networks on Modern GPUs". In Proc. Micro '52 (2019) (pp. 13).

Krashinsky, Ronny et al., "NVIDIA Ampere Architecture In-Depth." NVIDIA Developer Blog, Oct. 14, 2020, developer.nvidia. com/blog/nvidia-ampere-architecture-in-depth/.

Yao, Zhuliang et al., "Balanced Sparsity for Efficient DNN Inference on GPU." AAAI arXiv:1811.00206v4 (2019) (pp. 8).

International Search Report and Written Opinion, International Application No. PCT/EP2022/070966, International Filing Date Jul. 26, 2022.

* cited by examiner

EXPLOITING FINE-GRAINED STRUCTURED WEIGHT SPARSITY IN SYSTOLIC ARRAYS

BACKGROUND

The present invention relates in general to computing systems, and more particularly, to various embodiments for exploiting fine-grained structured weight sparsity in deep neural networks in a computing environment using a computing processor.

SUMMARY

According to an embodiment of the present invention, a method for exploiting fine-grained structured weight sparsity in deep neural networks a computing environment in a computing environment, by one or more processors, is depicted. Indices of non-zero weights may be stored in an index register file included within each of a plurality of processor elements in a systolic array. Non-zero weights may be stored in a register file associated with the index register file. Input values (e.g., dense input values) corresponding to a single block in a data structure may be sent to the plurality of processor elements. Those of the input values corresponding to the indices of non-zero weights in the index register file may be selected for performing multiply-accumulate ("MAC") operation based on sending the plurality of input values to one or more of the plurality of processor elements. The indices of the plurality of non-zero weight are stored in an index data stick. The values of the plurality of non-zero weights are stored in a value data stick.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

The present invention relates generally to exploiting fine-grained structured weight sparsity in deep neural networks in a computing environment using a computing processor.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts. Neural network (NN) based deep learning is a class of machine learning algorithms that use a cascade of many layers of nonlinear processing units for feature extraction and transformation. Each successive layer uses the output from the previous layer as input.

Moreover, DNNs exhibit sparsity in their data-structures. However, savings in execution time and energy savings may be achieved by exploiting this sparsity by skipping redundant zero operand multiply-accumulate ("MAC") operation for compute savings and by avoiding the storage and accesses of zero values for memory capacity and bandwidth savings. Additionally, a special form of data sparsity such as, for example, "fine-grained structured sparsity" can be favorably exploited on different DNN accelerators. For example, specialized pruning techniques may be used to impose fine-grained structured sparsity on weights. However, other existing techniques are unable to exploit fine-grained structured sparsity in systolic arrays-based computing systems or in native convolutions Accordingly, various implementations are provided for exploiting fine-grained structured weight sparsity in deep neural networks in a computing environment. In some implementations, a micro-architectural, dataflow and data storage support system is provided for exploiting fine-grained structured weight sparsity on systolic array-based DNN accelerators executing both native convolutions and matrix multiplications. As used herein, fine-grained structured weight sparsity is where a data structure is divided into B-size blocks and there are NZ number of non-zero elements within each of the B-size blocks, where "B" is a positive integer, where "NZ" is the count/number of non-zero valued elements in each block. In one aspect, NZ is a positive integer.

Also, in general, the systolic array may take two different data structures (e.g., inputs and weights) and generates an output. Thus, mechanisms of the various embodiments, provide an enhanced systolic array-based DNN accelerator where one of the input operands has the fine-grained structured weight sparsity. Also, various implementations provide for variability of a number of NZ numbers in any of the B-size blocks. For example, if there are 10 layers in the neural network, the first layer's weights may have two non zeros in each block and the second layer's weights may have three non zeros in each block, etc. As such, the enhanced systolic array-based DNN accelerators enable flexibility or the programmability for various executions of that hardware while configuring the number of non-zeros.

In an additional aspect, various implementations provide for indices of non-zero weights may be stored in an index register file included within each of a plurality of processor elements in a systolic array. Non-zero weights may be stored in a register file associated with the index register file. Input values corresponding to a single block in a data structure may be sent to the plurality of processor elements. Those of the input values corresponding to the indices of non-zero weights in the index register file may be selected for performing multiply-accumulate ("MAC") operation based on sending the plurality of input values to one or more of the plurality of processor elements.

In some implementations, non-zero weight indices may be stored in an index register file included within each of processor elements in a systolic array. Non-zero weights values may be stored in a register file associated with the index register file. The dense input values corresponding to a single block in a data structure may be sent to one or more of the processor elements, a plurality of elements. That is, the dense input data, corresponding to a single block in a data structure, flow from west to east in the systolic array. Those of the input values corresponding to the indices of the non-zero weights in the index register file may be selected for performing multiply-accumulate ("MAC") operation based on sending the input values to the processor elements.

It should be noted that, as used herein, "input values" include a sparse input value and a dense input value. "Weights" may be considered as sparse input values and the dense input values may be other data structure flowing along west to east in the systolic arrays. Also, "Input activations" may be considered as an example of dense input values.

In some implementations, the number of entries of the indices of the plurality of non-zero weights in the index register file correspond to a number of entries of the plurality of non-zero weights in the register file. The selected input values (e.g., B-sized block values of a data structure) may be latched and reused for one or more non-zero cycles to complete a plurality of MAC operations on each of the plurality of non-zero weights. The non-zero weight indices may be stored in an index data stick. The values of the non-zero weights may be stored in a value data stick. The non-zero weight indices and the values of the non-zero weights may be stored in the register file using a data stick where the data stick includes one or more an index data stick and one or more value data sticks. In some implementations, the non-zero weight indices and the values of the non-zero weights within the single block in the data structure correspond to an NZ number (e.g., where "NZ" represents the count/number of non-zero weights in a block) of different index data sticks and value data sticks.

In an alternative implementation for exploiting fine-grained structured weight sparsity in deep neural networks, non-zero weight indices are stored in an index register file included within one or more processor elements. The non-zero weights (e.g., non-zero weight values) are stored in a register file associated with the index register file. One or more input values of a data structure, flowing along a west to east direction of the systolic array, corresponding to the non-zero weights indices in the index register file may be selected for performing multiply-accumulate ("MAC") operations on each of the plurality of non-zero weights where the input values of the data structure are reused for each of the MAC operations. The non-zero weights and the selected value from the dense data-structure along west to east are the input operands to the MAC.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
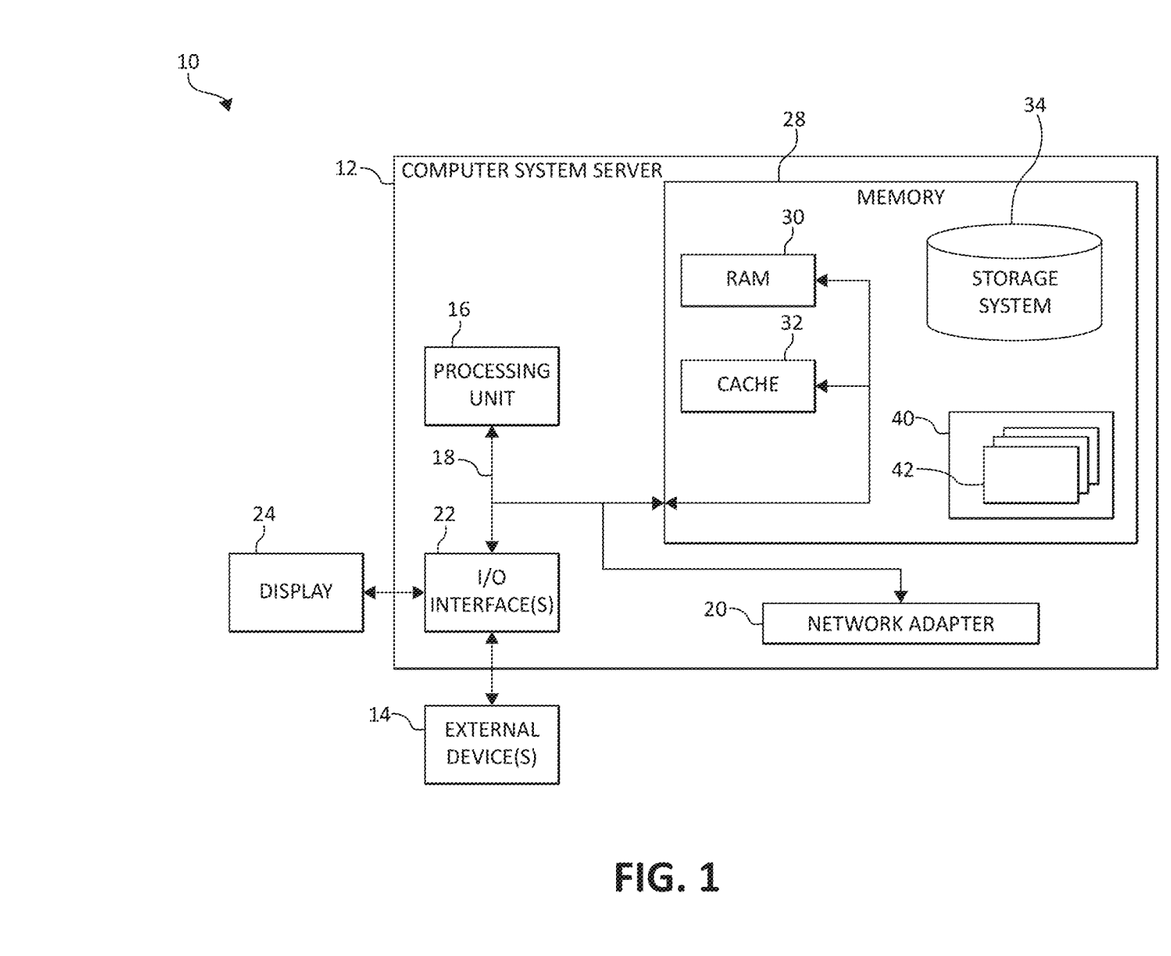
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
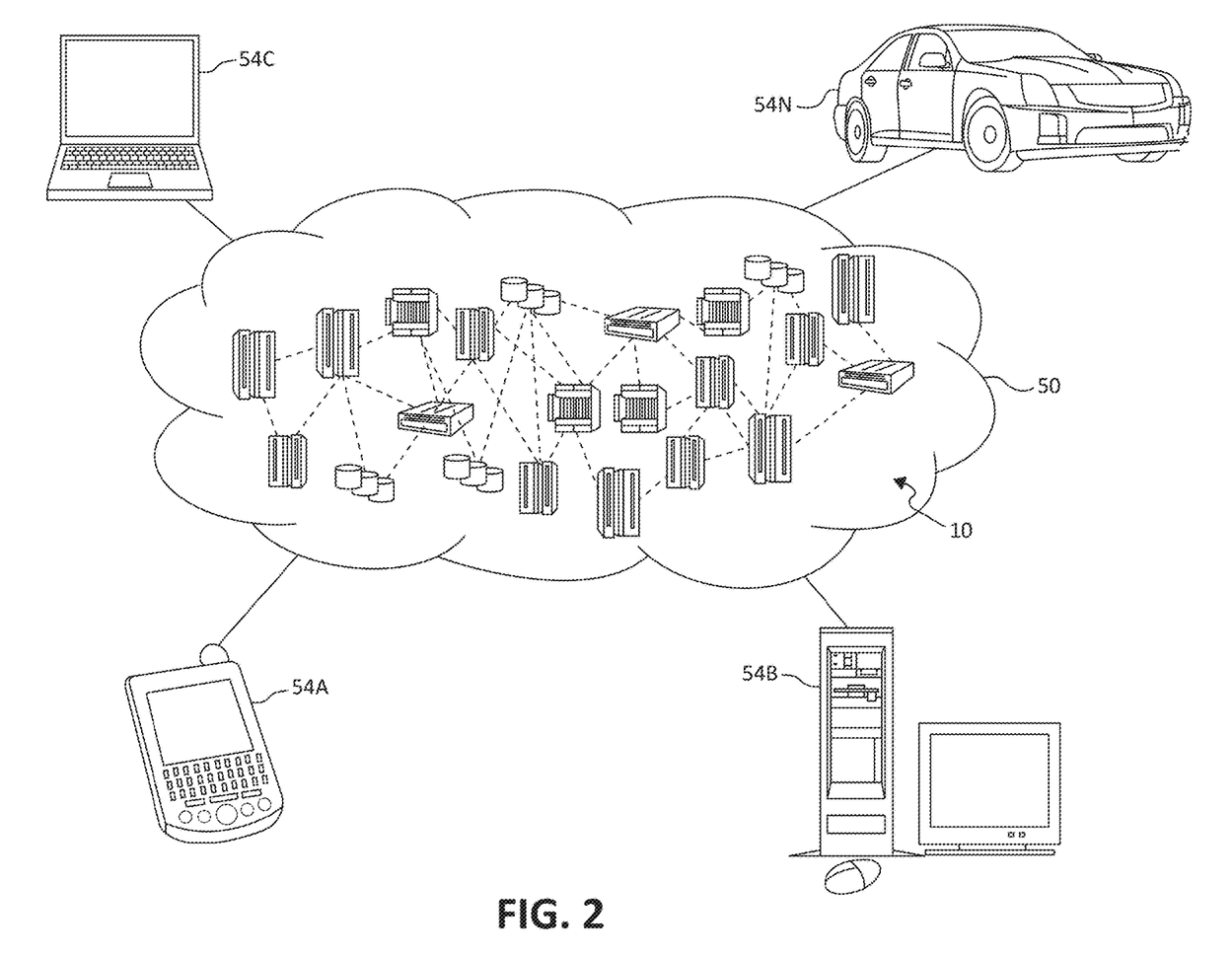
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
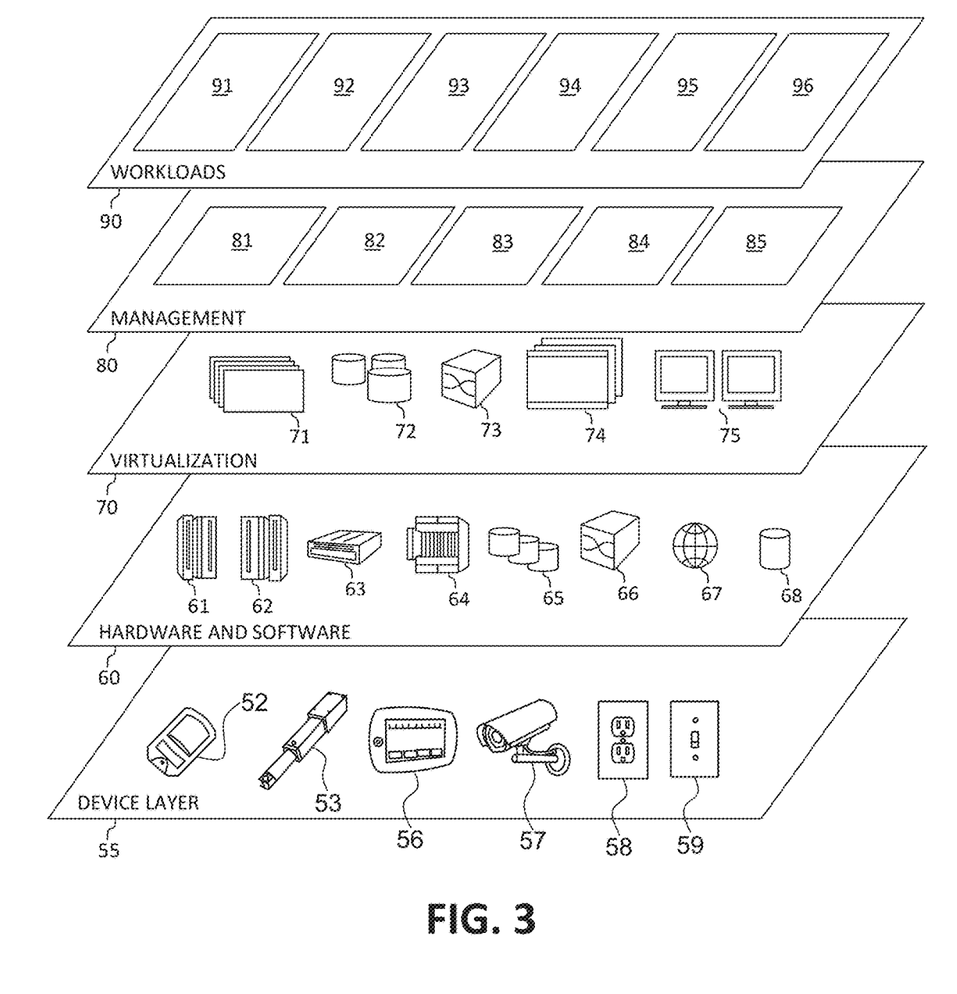
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for exploiting fine-grained structured weight sparsity in a computing environment (e.g., in a neural network architecture). In addition, workloads and functions 96 for exploiting fine-grained structured weight sparsity in a computing environment may include such operations as analytics, deep learning, and as will be further described, user and device management functions. One of ordinary skill in the art will appreciate that the workloads and functions 96 for exploiting fine-grained structured weight sparsity in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, various aspects of the mechanisms of the present disclosure provide for exploiting fine-grained structured weight sparsity in deep neural networks a computing environment. Indices of non-zero weights may be stored in an index register file included within each of a plurality of processor elements in a systolic array. Non-zero weights may be stored in a register file associated with the index register file. Input values corresponding to a single block in a data structure may be sent to the plurality of processor elements. Those of the input values corresponding to the indices of non-zero weights in the index register file may be selected for performing multiply-accumulate ("MAC") operation based on sending the plurality of input values to one or more of the plurality of processor elements.

Figure 4:
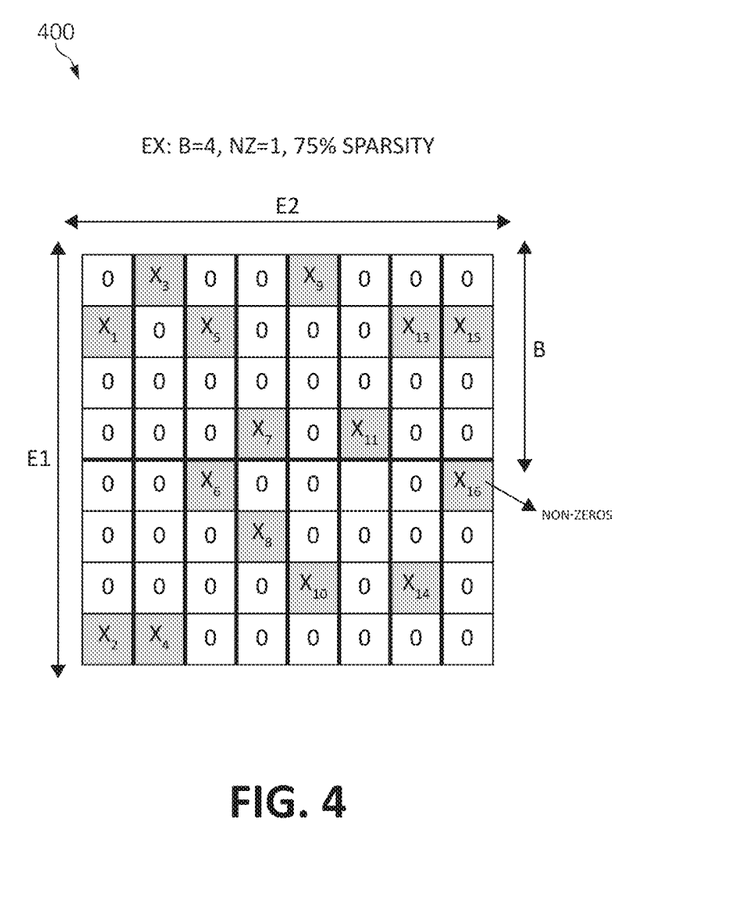
FIG. 4 is an additional block diagram depicting an exemplary data structure with fine-grained structured sparsity in a computing environment according to an embodiment of the present invention.

For further explanation, FIG. 4 is an example block diagram depicting an exemplary data structure 400 with fine-grained structured sparsity in a computing environment according to an embodiment of the present invention. The data structure 400 is a two-dimensional ("2D") array having multiple rows and columns. The 2D data structure 400 also depicts a first dimension such as, for example, dimension E1 in the vertical direction (as the columns), and a second dimension such as, for example, dimension E2 in the horizontal directions (as the rows). The data structure 400 is represented as having multiple B-sized blocks along a first dimension such as, for example, dimension E1, of the data-structure 400. The data structure 400 also includes a fixed sparsity fraction which means a fixed number of non-zeros ("NZ") across each of the B-sized blocks. It should be noted that the E1 dimension is in the vertical direction and the second dimension is in the horizontal direction. However, these shown by way of example only, and alternative configurations may be applied. For example, the B-sized blocks may be in the second dimension in the horizontal direction.

For example, the data structure 400, by way of example only, sets the conditions that the block size is four and the fixed number of the NZ number is one. As such, only one NZ value is placed in each group of four blocks in the first dimension. For example, the NZ number X1 is located in the first group of the B-sized blocks in the first dimension (e.g., the E1dimension). In the second grouping of the B-sized blocks in the first dimension (e.g., the E1dimension) is the value of X3. In the third grouping of the B-sized blocks in the first dimension (e.g., the E1dimension) is the value of X5. In the fourth grouping of the B-sized blocks in the first dimension (e.g., the E1dimension) is the value of X7. Thus, data structure 400 illustrates, based on one or more conditions (e.g., the size of the blocks is B, which is 4 and the NZ is only 1) which may be predefined or learned using machine learning, only one NZ number is stored in the B-sized blocks of the data structure 400. Also, only the 1 NZ number is only used in this example, but, in general, there may be any NZ number of non-zeros.

In general, the B-sized blocks of the data structure 400 may support any block size that is selected or defined. Also, the data structure 400 may require the condition that a constant or consistent number of the non-zero numbers be within the B-sized blocks. The number of NZ numbers is also less than or equal to the B-sized blocks (e.g., 1 NZ number up to the value of the B-sized blocks such as, for example, the value 4 as used in the illustrated embodiment of FIG. 4). Based on this structure of the data structure 400, the fine-grained structured sparsity in the data structure 400 is achieved during run-time execution of a DNN.

Figure 5:
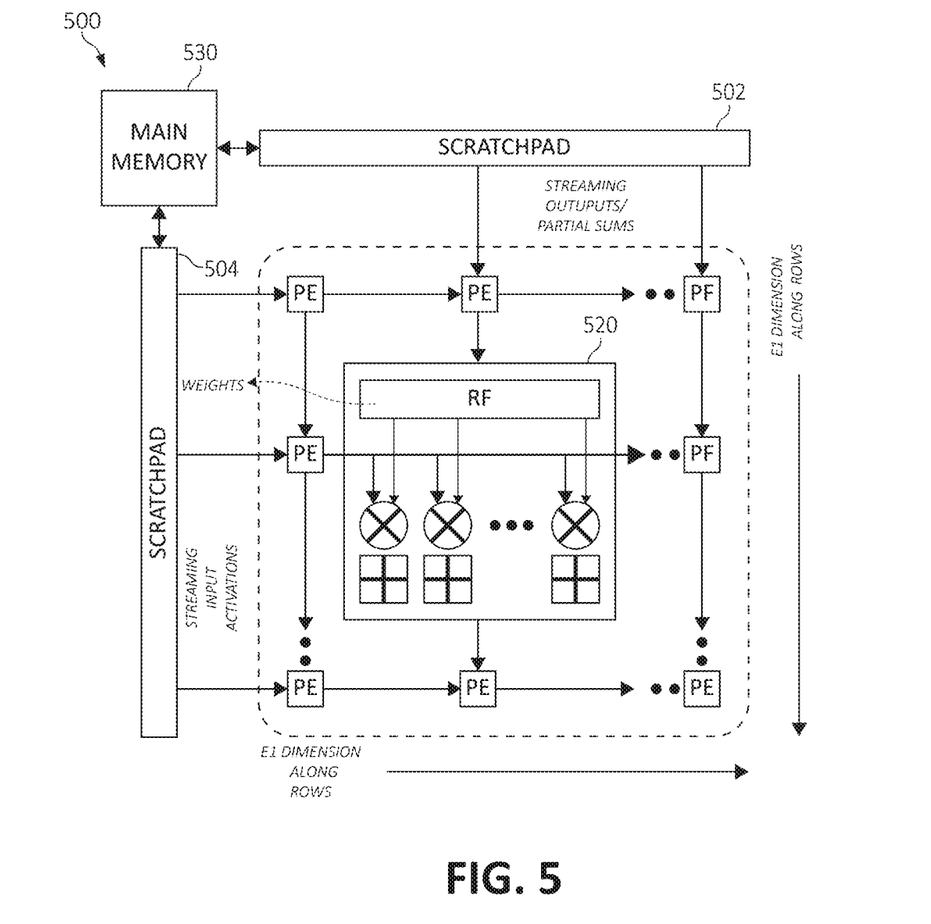
FIG. 5 is an additional block diagram depicting an exemplary computing system having two-dimensional ("2D") systolic array of processing elements ("PE's") according to an embodiment of the present invention.

For further explanation, FIG. 5 is an additional block diagram depicting an exemplary computing system including two-dimensional ("2D") systolic array of processing elements ("PE's) according to an embodiment of the present invention. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-3. Repetitive description of like elements employed in other embodiments described herein is omitted for sake of brevity.

In one aspect, the computing system 500, which may be included in the computing system/server 12 of FIG. 1, may include a memory 530, one or more scratchpads such as, for example, scratchpads 502 and 504, and an array 506 (e.g., a systolic array) of the processing elements ("PE"), which may be including in a processing core (not shown for illustrative convenience).

In some implementations, the array 506 may be an N×N array of the processing elements having a 2-D-torus-like interconnection network to support systolic dataflow. As depicted, a register file ("RF") 520 is shown in communication with one or more of the processing elements ("PE"). In some implementations, the 2D array 506 of PE's may include a first dimension such as, for example, the E1 dimension in the vertical direction (as the columns), and a second dimension such as, for example, the E2 dimension in the horizontal directions (as the rows). However, mapping operations may be performed by mapping along rows in the E1 dimensions and mapping along columns in the E2 dimensions.

Additionally, the processing elements in the array 506 may receive data (e.g., streaming outputs, partial sums, and streaming input variations) from different levels of memory (e.g., the scratchpads 502, 504 and the main memory 530). Weights (e.g., sparse data structure or "sparse input") may be stored in within each processor element ("PE") in the register file. Inputs (e.g., dense data structures or "dense inputs") and outputs may be streamed from a west direction and a north direction. For example, one or more input activations may be streamed from the scratch pad 504 (e.g., from the west direction) and one or more outputs/partial sum values may be streamed from the scratchpad 502 (e.g., from the north direction).

Exploiting fine-grained structured weight sparsity on systolic arrays such as, for example, the array 506, executing weight stationary dataflow involves 1) storing only non-zero weight values in all levels of memory (e.g., from main memory 530 to the register file 520) along with the index values of the non-zero weights within a block; 2) simultaneously sending all input activations corresponding to a single block from west to east, and 3) selecting the right input activation values corresponding to the non-zero weight value within each SIMD before performing MAC on them. As such, an additional index register file is provided as illustrated in FIG. 6.

Figure 6:
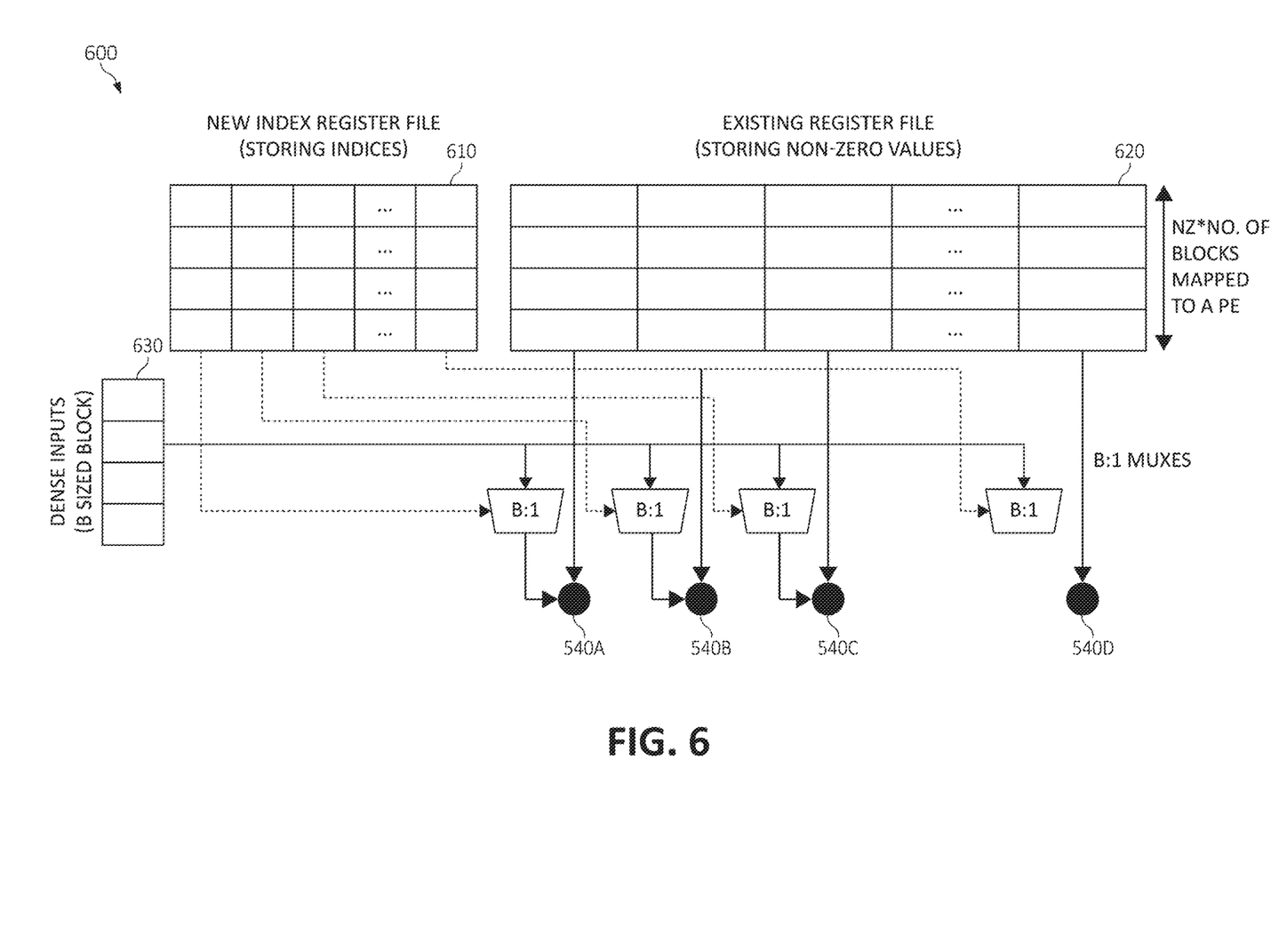
FIG. 6 is an additional block diagram depicting an index register files ("IRF") and a register file ("RF") in a processor element according to an embodiment of the present invention.

For further explanation, FIG. 6 is a block diagram depicting an index register file ("IRF") 610 and a register file ("RF") 620 in a processor element according to an embodiment of the present invention. In one aspect, one or more of the components, modules, services, applications, and/or functions described in FIGS. 1-5 may be used in FIG. 6. Repetitive description of like elements employed in other embodiments described herein is omitted for sake of brevity.

In some implementations, the index register file 610 stores the non-zero weight index values (e.g., indices or non-zero weight indices). The register file 620 only stores non-zero weights. Each of the B values (e.g., B-size block values) corresponding to a block may be sent to all processor elements (PE) in a row. One or more additional MUX components 540A-D (e.g., a B:1MUX) is used and position before each multiply-accumulate ("MAC") operation within a processor element. The additional MUX components 540A-D may be used to select the input operands corresponding to its non-zero weight index. In one aspect, the input operands are the dense inputs (e.g., dense data structures) flowing from left to right (e.g., input activations) to the systolic array. Also, the same block of inputs (e.g., one B-sized block of dense inputs (e.g., values flowing from left to right in the systolic array)) may be latched at reused for NZ cycles, where NZ is the count/number of non-zeros in each block, to allow inputs corresponding to all NZ non-zero weights to be consumed, operated on (e.g., performed a MAC operation with) and used. It should be noted that the fine-grain weight sparsity pattern ensures each MAC operates on the fixed NZ number of non-zeros within a block.

Additionally, in order to transfer the index and non-zero values into the index register file and the register file efficiently, the memory may be accessed in the granularity of data-sticks (e.g., contiguous 128 bytes ("B") of data). That is, the index and non-zero values are coming or received from the main memory or scratchpad. In some implementations, one or more data-sticks may be used where the data-stick is a sparse storage format data-stick that scales across sparsity levels and data-precisions. It should be noted that "sparse storage format" refers to a compressed storage format to efficiently store a sparse data structure (e.g., weights) that can provide memory and bandwidth savings. "Data stick friendly" means that the sparse storage format may easily conform to a data stick kind of access (e.g., contiguous 128 B of access).

In some implementations, the index and values of non-zeros in a block may be stored in different data sticks such as, for example, value sticks (e.g., value data-sticks) and index sticks (e.g., index data-sticks). For example, indices of the non-zero weights may be stored in an index data stick and the values of the non-zero weights may be stored in a value data stick.

In some implementations, values within a single block are assigned/go to a NZ number of separate value data sticks. The value precision is an original data precision of weights. For weights precision less than 16 bits, one value data stick may combine values from different blocks to fill an entire size of the value data stick. Filling the value data stick with different non-zeros within a single block may lead to stick underutilization at higher sparsity levels as a sufficient number of non-zeros will be unavailable.

In some implementations, indices within one block may be assigned/go to a NZ number of separate index data sticks. The index precision of the index data sticks may be a function of the B-size block value size ("B") such as, for example, by dividing 128B (e.g., 2 for B=4, 4 for B=8). In order to fill an entire index data stick, one index data sticks further combines indices corresponding to multiple value data sticks corresponding to different blocks.

Thus, sparse weights may be organized into data-sticks (e.g., contiguous 128B of data). Non-zero weight values and indices are stored in separate data-sticks (e.g., a value stick and an index stick). The values and indices within one block are sent, assigned, or go to a NZ number of separate value sticks and index sticks. The values and indices corresponding to multiple blocks can be combined to fill an entire data-stick at low precisions.

Figure 7:
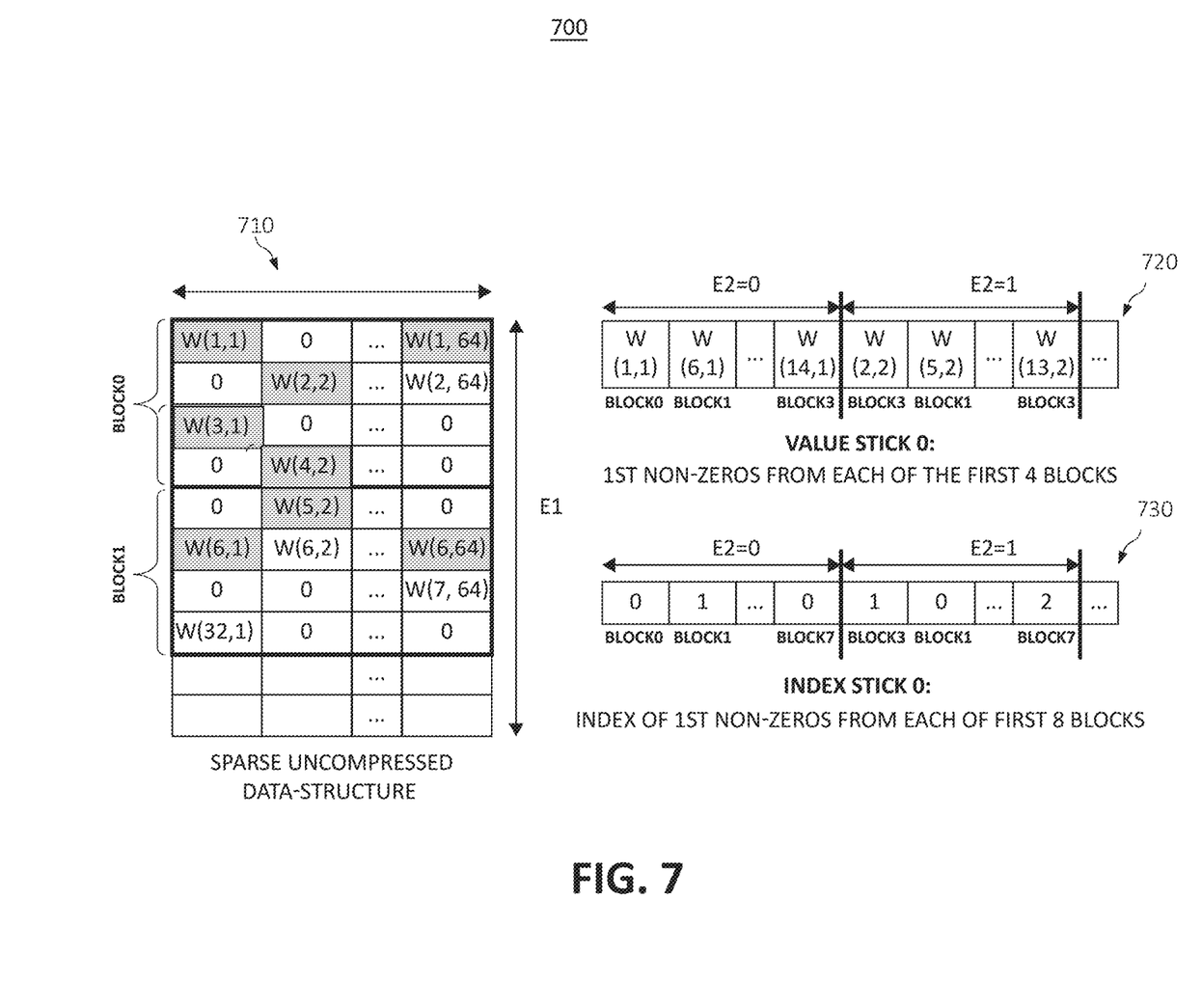
FIG. 7 is an additional block diagram depicting a compressed storage format using data-sticks according to an embodiment of the present invention.

For further explanation, FIG. 7 is an additional block diagram 700 depicting a compressed storage format using data-sticks according to an embodiment of the present invention.

In one aspect, a 2D sparse uncompressed data structure 710 is depicted multiple blocks such as, for example, block 1 and block 0. The 2D sparse uncompressed data structure 710 also includes a first dimension such as, for example, E1 dimension in the vertical direction (as the columns), and a second dimension such as, for example, E2 dimension in the horizontal directions (as the rows). By way of example only, the B-sized blocks value is defined as 4 along the E1 dimension, the 64 along the E2 dimension. A weight precision is defined as being equal to 4 bits and the data stick have a 128B format. As such, 4 bits are assigned per value and 2 bits are assigned per index. The value stick 0 (e.g., value data stick 720) combines the first non-zero values from 4 consecutive blocks to fill the entire value data stick 720. For example, the weight (1,1), weight (6,1), and weight (14, 1) (not shown in for illustrative convenience) from the first column in E2 (e.g., E2=0) are stored in the value data stick 720. The weight (2,2), weight (5,2), and weight (13, 2) from the second column in E2 (e.g., E2=0) are stored in the value data stick 720. Thus, based on the defined conditions, the first non-zeros from each of the first 4 blocks are stored in the value data stick 720.

The index stick 0 (e.g., index data stick 730) combines the first non-zero indices from 8 consecutive blocks to fill the index data stick 730. For example, the values 0, 1, . . . , and 0 which are indices corresponding to weights W(1,1), W(6, 1), and W(29, 1) (not shown in for illustrative convenience in data structure 710) from the first column in E2 (e.g., E2=0) are stored in the index data stick 730. Thus, based on the defined conditions, the indices of the first non-zeros from each of the first 8 blocks are stored in the index data stick 730.

Figure 8:
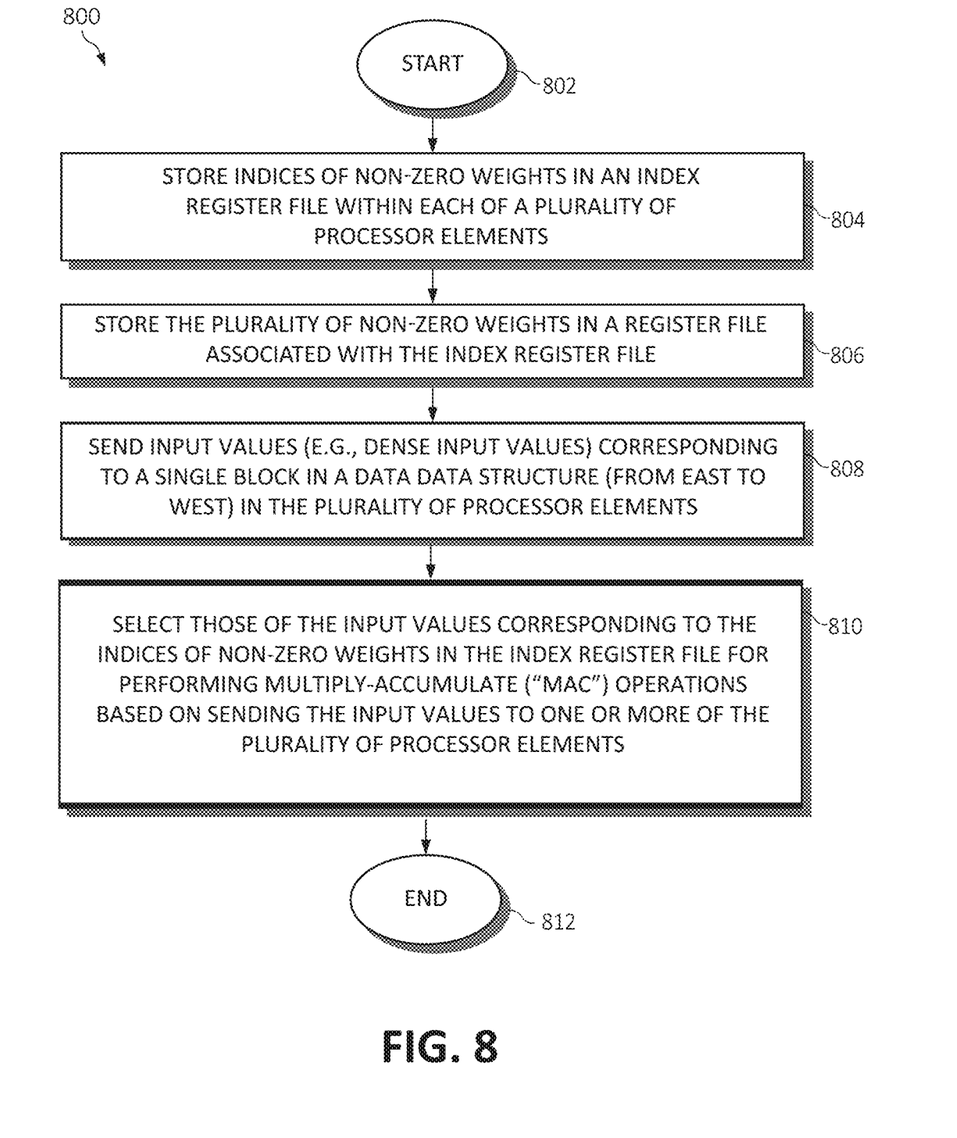
FIG. 8 is a flowchart diagram depicting an exemplary method for exploiting fine-grained structured weight sparsity in deep neural networks in a computing environment, by a processor, in which aspects of the present invention may be realized.

For further explanations, FIG. 8 is a method 800 for exploiting fine-grained structured weight sparsity in deep neural networks in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

Indices of non-zero weights may be stored in an index register file included within each of a plurality of processor elements in a systolic array, as in block 804. Non-zero weights may be stored in a register file associated with the index register file, as in block 806. Input values (e.g., dense input values) corresponding to a single block in a data structure may be sent (e.g., in an east to west direction in the array) to the plurality of processor elements, as in block 808. Those of the input values corresponding to the indices of non-zero weights in the index register file may be selected for performing multiply-accumulate ("MAC") operation based on sending the plurality of input values to one or more of the plurality of processor elements, as in block 810. The functionality 800 may end, as in block 812.

In some implementations, the indices of the non-zero weight and the values of the plurality of non-zero weights within the single block in the data structure correspond to an NZ non-zero number of different index data sticks and value data sticks (where NZ indicates the count/number of non-zeros in a block).

In one aspect, in conjunction with and/or as part of at least one blocks of FIG. 8, the operations of method 800 may include each of the following. The operations of 800 may ensure that a number of entries of the indices of the plurality of non-zero weights in the index register file correspond to a number of entries of the plurality of non-zero weights in the register file. The operations of 800 may reuse (and latch) the one or more of the plurality of input values for one or more non-zero cycles to complete a plurality of MAC operations on each of the plurality of non-zero weights.

The operations of 800 may store the indices of the plurality of non-zero weight in an index data stick. The operations of 800 may store values of the plurality of non-zero weights in a value data stick. The operations of 800 may transfer the indices of the plurality of non-zero weight and the values of the plurality of non-zero weights into the register file using a data stick, wherein the data stick includes one or more an index data stick and one or more value data sticks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for exploiting fine-grained structured weight sparsity in deep neural networks in a computing environment, by one or more processors, comprising:
   storing indices of a plurality of non-zero weights in an index register file included within each of a plurality of processor elements in a systolic array;
   storing the plurality of non-zero weights in a register file associated with the index register file, wherein only values of the non-zero weights are stored in all memory levels associated with the plurality of processor elements in the systolic array;
   sending, to one or more of the plurality of processor elements, a plurality of input values corresponding to a single block in a data structure; and
   selecting one or more of the plurality of input values corresponding to the indices of the plurality of non-zero weights in the index register file for performing multiply-accumulate ("MAC") operation based on sending, to the one or more of the plurality of processor elements, the plurality of input values.

2. The method of claim 1, further including ensuring that a number of entries of the indices of the plurality of non-zero weights in the index register file correspond to a number of entries of the plurality of non-zero weights in the register file, wherein an input value includes a sparse input value and a dense input value.

3. The method of claim 1, further including reusing the one or more of the plurality of input values for one or more non-zero cycles to complete a plurality of MAC operations on each of the plurality of non-zero weights.

4. The method of claim 1, further including storing the indices of the plurality of non-zero weight in an index data stick.

5. The method of claim 1, further including storing values of the plurality of non-zero weights in a value data stick.

6. The method of claim 1, further including transferring the indices of the plurality of non-zero weight and the values of the plurality of non-zero weights into the register file using a data stick, wherein the data stick includes one or more an index data stick and one or more value data sticks.

7. The method of claim 5, wherein the indices of the plurality of non-zero weight and the values of the plurality of non-zero weights within the single block in the data structure correspond to a non-zero number of different index data sticks and value data sticks.

8. A system for exploiting fine-grained structured weight sparsity in deep neural networks in a computing environment, comprising:
   one or more computers with executable instructions that when executed cause the system to:
      store indices of a plurality of non-zero weights in an index register file included within each of a plurality of processor elements in a systolic array;
      store the plurality of non-zero weights in a register file associated with the index register file, wherein only values of the non-zero weights are stored in all memory levels associated with the plurality of processor elements in the systolic array;
      send, to one or more of the plurality of processor elements, a plurality of input values corresponding to a single block in a data structure; and
      select one or more of the plurality of input values corresponding to the indices of the plurality of non-zero weights in the index register file for performing multiply-accumulate ("MAC") operation based on sending, to the one or more of the plurality of processor elements, the plurality of input values.

9. The system of claim 8, wherein the executable instructions when executed cause the system to ensure that a number of entries of the indices of the plurality of non-zero weights in the index register file correspond to a number of entries of the plurality of non-zero weights in the register file.

10. The system of claim 8, wherein the executable instructions when executed cause the system to reuse the one or more of the plurality of input values for one or more non-zero cycles to complete a plurality of MAC operations on each of the plurality of non-zero weights.

11. The system of claim 8, wherein the executable instructions when executed cause the system to store the indices of the plurality of non-zero weight in an index data stick.

12. The system of claim 8, wherein the executable instructions when executed cause the system to store values of the plurality of non-zero weights in a value data stick.

13. The system of claim 8, wherein the executable instructions when executed cause the system to transfer the indices of the plurality of non-zero weight and the values of the plurality of non-zero weights into the register file using a data stick, wherein the data stick includes one or more an index data stick and one or more value data sticks.

14. The system of claim 8, wherein the indices of the plurality of non-zero weight and the values of the plurality of non-zero weights within the single block in the data structure correspond to a non-zero number of different index data sticks and value data sticks.

15. A computer program product for defending deep generative models from adversarial attacks in a computing environment, the computer program product comprising:
one or more non-transitory computer readable storage media, and program instructions collectively stored on the one or more non-transitory computer readable storage media, the program instruction comprising:
program instructions to store indices of a plurality of non-zero weights in an index register file included within each of a plurality of processor elements in a systolic array;
program instructions to store the plurality of non-zero weights in a register file associated with the index register file, wherein only values of the non-zero weights are stored in all memory levels associated with the plurality of processor elements in the systolic array;
program instructions to send, to one or more of the plurality of processor elements, a plurality of input values corresponding to a single block in a data structure; and
program instructions to select one or more of the plurality of input values corresponding to the indices of the plurality of non-zero weights in the index register file for performing multiply-accumulate ("MAC") operation based on sending, to the one or more of the plurality of processor elements, the plurality of input values.

16. The computer program product of claim 15, further including program instructions to ensure that a number of entries of the indices of the plurality of non-zero weights in the index register file correspond to a number of entries of the plurality of non-zero weights in the register file.

17. The computer program product of claim 15, further including program instructions to reuse the one or more of the plurality of input values for one or more non-zero cycles to complete a plurality of MAC operations on each of the plurality of non-zero weights.

18. The computer program product of claim 15, further including program instructions to store the indices of the plurality of non-zero weight in an index data stick.

19. The computer program product of claim 15, further including program instructions to store values of the plurality of non-zero weights in a value data stick.

20. The computer program product of claim 15, further including program instructions to transfer the indices of the plurality of non-zero weight and the values of the plurality of non-zero weights into the register file using a data stick, wherein the data stick includes one or more an index data stick and one or more value data sticks.

21. The computer program product of claim 15, wherein the indices of the plurality of non-zero weight and the values of the plurality of non-zero weights within the single block in the data structure correspond to a non-zero number of different index data sticks and value data sticks.

22. A method for exploiting fine-grained structured weight sparsity in deep neural networks in a computing environment, by one or more processors, comprising:
storing indices of a plurality of non-zero weights in an index register file included within each of a plurality of processor elements;
storing the plurality of non-zero weights in a register file associated with the index register file, wherein only values of the non-zero weights are stored in all memory levels associated with the plurality of processor elements; and
selecting one or more input values of a data structure corresponding to the indices of the plurality of non-zero weights in the index register file as input operands for performing multiply-accumulate ("MAC") operations on each of the plurality of non-zero weights, wherein the one or more input values of a data structure are reused for each of the MAC operations.

23. A method for exploiting fine-grained structured weight sparsity in deep neural networks in a computing environment, by one or more processors, comprising:
storing non-zero weights indices in an index register file included within each of a plurality of processor elements;
storing a plurality of non-zero weights in a register file associated with the index register file, wherein only values of the non-zero weights are stored in all memory levels associated with the plurality of processor elements;
performing multiply-accumulate ("MAC") operations on one or more nth-size block input value from a data structure sent to the plurality of processor elements using the non-zero weights indices as input operands; and
continuously executing the MAC operations on each of the plurality of non-zero weights corresponding to the non-zero weights indices by re-using the one or more nth-size block input value from the data structure.

24. The method of claim 1, further including:
storing the indices of the plurality of non-zero weight in an index data stick; and
storing values of the plurality of non-zero weights in a value data stick.

25. The method of claim 1, further including transfer the indices of the plurality of non-zero weight and the values of the plurality of non-zero weights into the register file using a data stick, wherein the data stick includes one or more an index data stick and one or more value data sticks.

* * * * *